United States Patent [19]

Seto et al.

[11] Patent Number: 4,829,501

[45] Date of Patent: May 9, 1989

[54] CLAMPER FOR DISK PLAYER

[75] Inventors: Yasuhiko Seto; Junji Takahashi, both of Saitama, Japan

[73] Assignee: Pioneer Electronic Corporation, Tokyo, Japan

[21] Appl. No.: 178,946

[22] Filed: Apr. 7, 1988

[30] Foreign Application Priority Data

Apr. 7, 1987 [JP] Japan .................................. 62-85359
Apr. 7, 1987 [JP] Japan .................................. 62-85360

[51] Int. Cl.$^4$ ........................................... G11B 17/04
[52] U.S. Cl. ...................................... 369/75.2; 369/270
[58] Field of Search ............................... 369/75.2, 270

[56] References Cited

U.S. PATENT DOCUMENTS 4,672,598 6/1987 Koken et al. ...................... 369/75.2

FOREIGN PATENT DOCUMENTS 5658167 5/1984 Japan .................................. 369/75.2
61-248262 11/1986 Japan .................................. 369/75.2

Primary Examiner—Steven L. Stephan
Attorney, Agent, or Firm—Sughrue, Mion, Zinn, Macpeak & Seas

[57] ABSTRACT

A clamper for a disk player is disclosed. A locking lever is fitted in a turnable manner on a clamping cam which is moved backward and forward in a prescribed position along a chassis in the body of the disk player to move up and down a clamper holder fitted with the clamping cam, to clamp the recording disk on the spindle motor. The locking lever is provided with a driving force transmission portion and an action control portion. The driving force transmission portion is engaged with an operating unit for transmitting a driving force in a timed manner. The action control portion is engaged in an action control cam groove provided in the chassis and having a locking portion and a locking/unlocking guide cam surface. When a timed driving force is applied to the locking lever by the backward movement of the operating unit in the direction of retraction. The action control portion is engaged and guided in the action control cam groove so that the locking lever is turned for unlocking and performs a backward movement in a prescribed position; when a timed driving force is applied to the locking lever by the forward movement of the operating unit in the direction of protrusion. The action control portion is engaged and guided in the action control cam groove so that the locking lever performs a forward movement in a prescribed position and is turned for locking. The clamping cam, which is moved together with the locking lever, is moved backward and foward in a prescribed position in a timed manner along with the action of the locking lever so as to clamp the recording disk on the spindle motor in a timed manner. An urging portion is provided in an appropriate position on one of the chassis and the locking lever which are components of the clamper. An urging portion controller is provided in an appropriate position on the other of the chassis and the locking lever. Only when the action control portion is in a front and a rear positions wherein the action control portion is engaged with and disengaged from the locking portion, an urging force acts so that the action control portion operates while being in contact with the locking/unlocking guide cam surface.

8 Claims, 11 Drawing Sheets

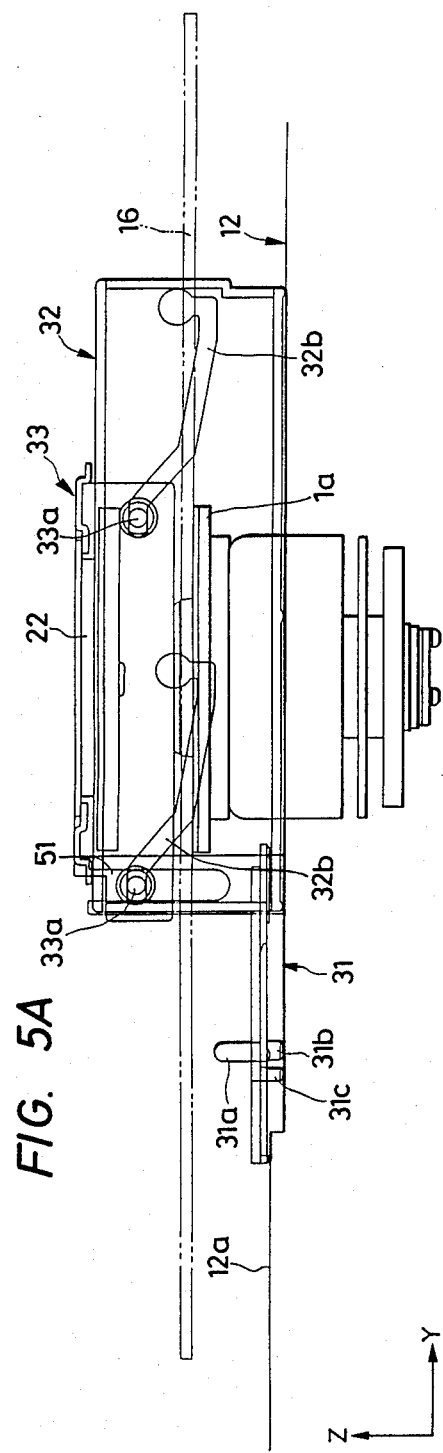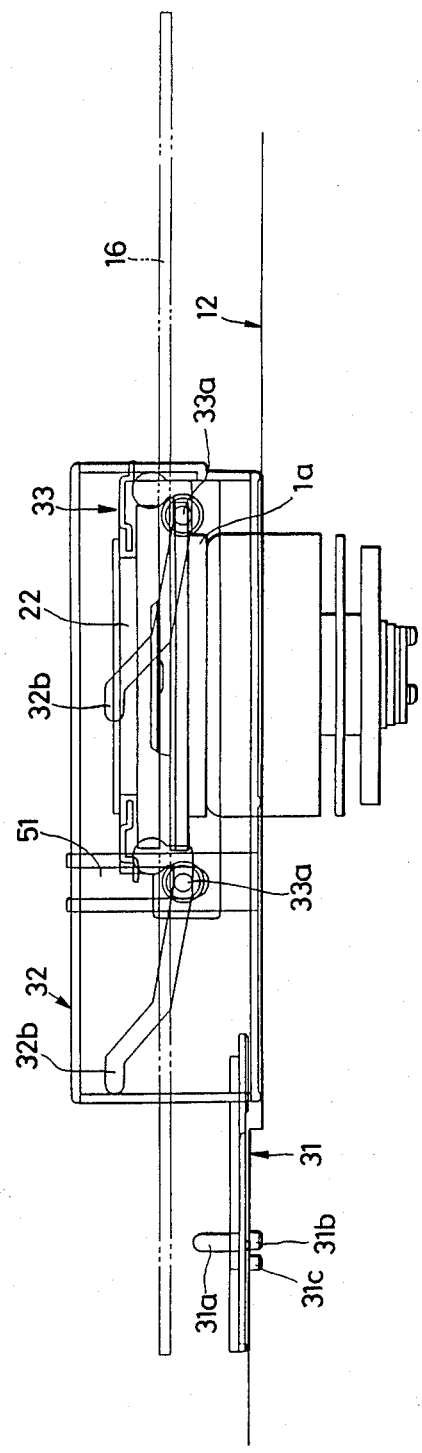

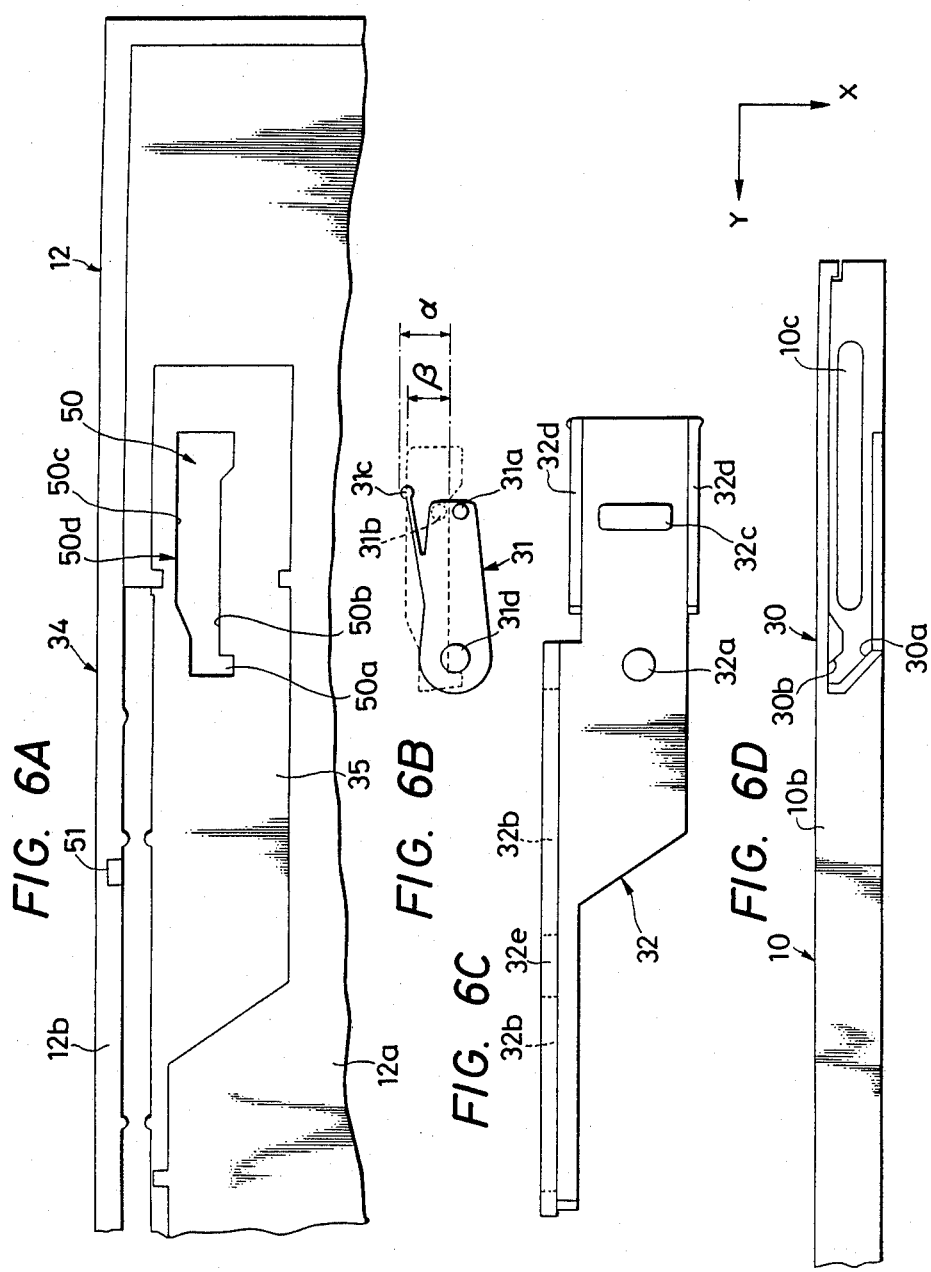

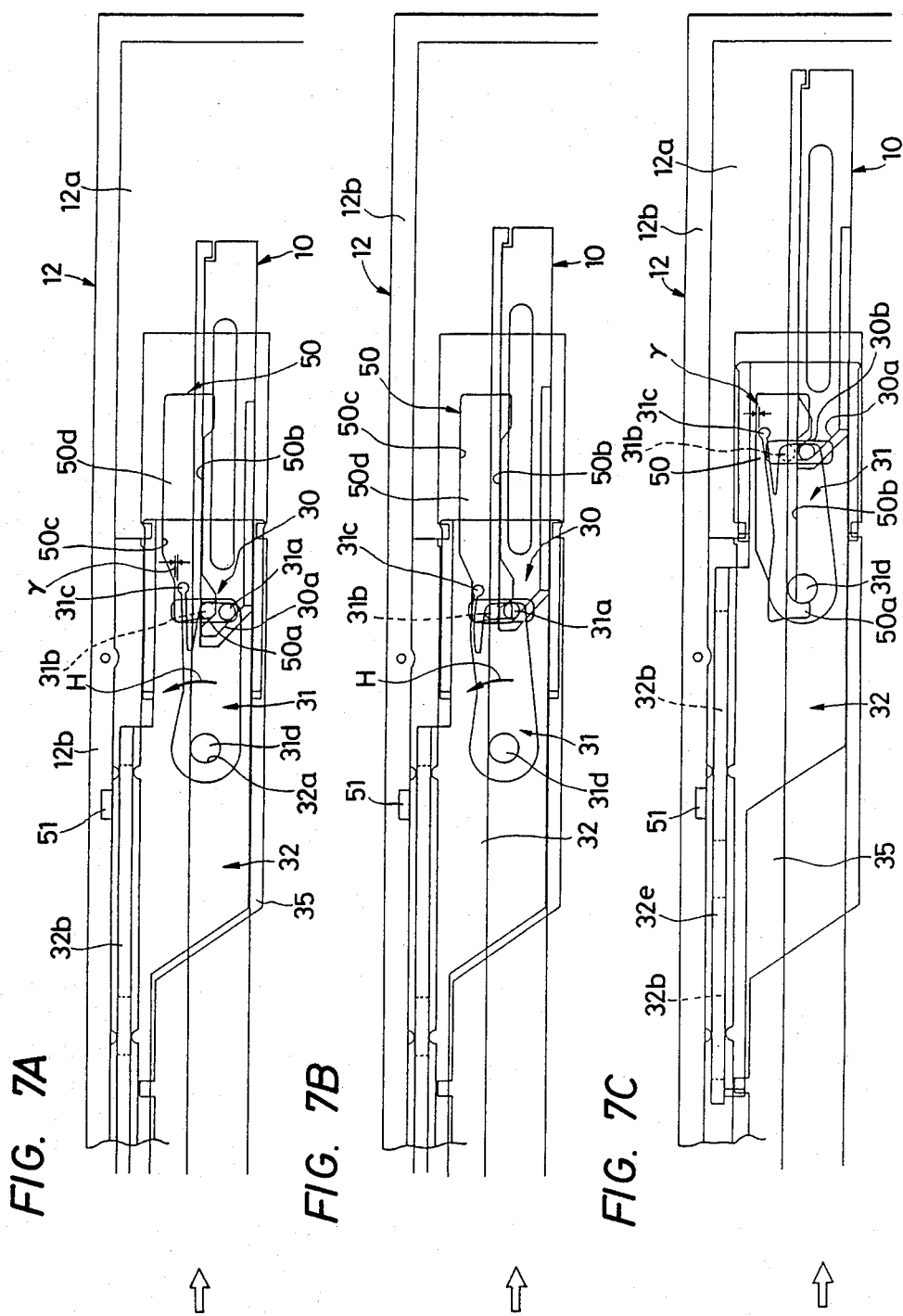

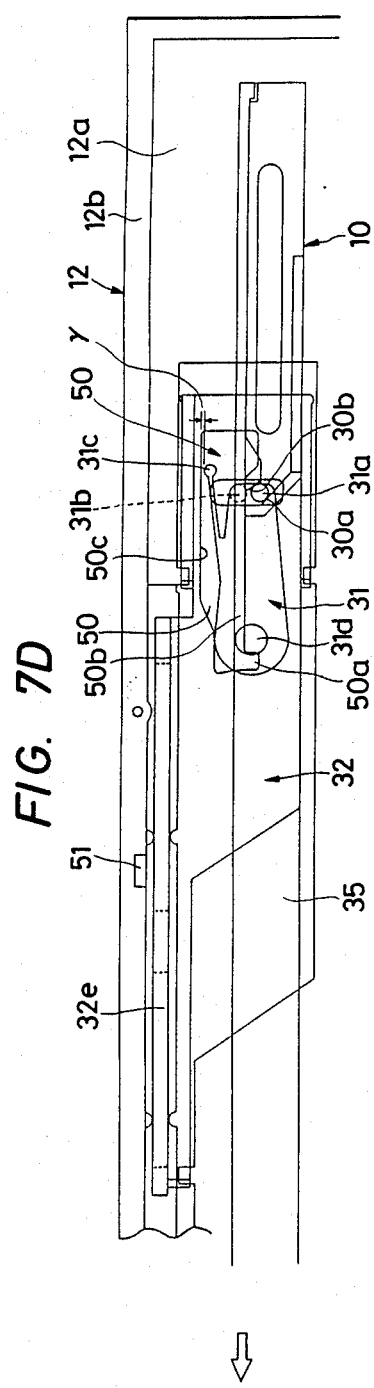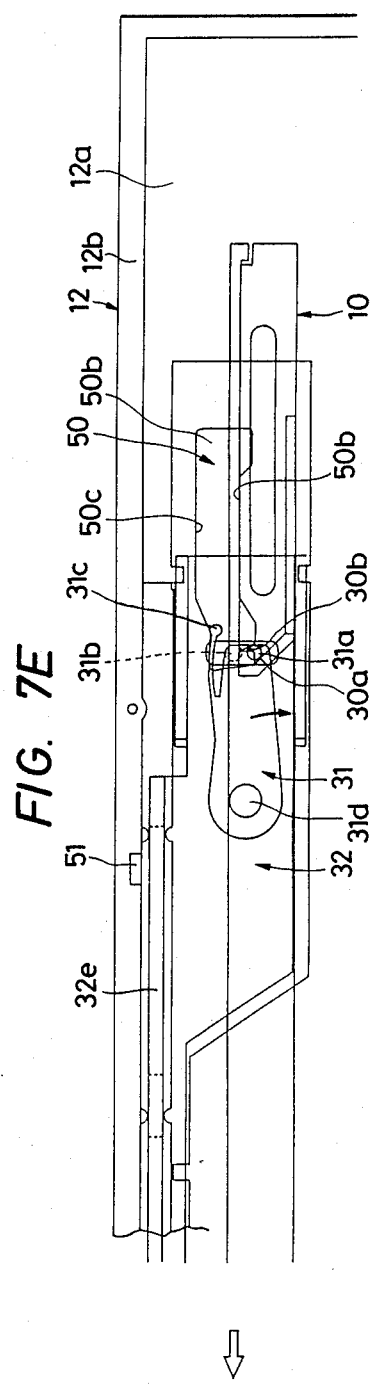

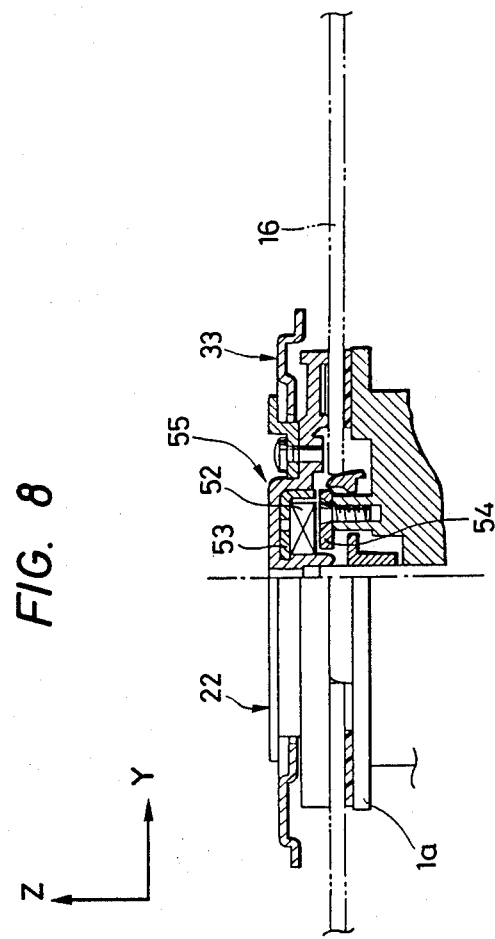

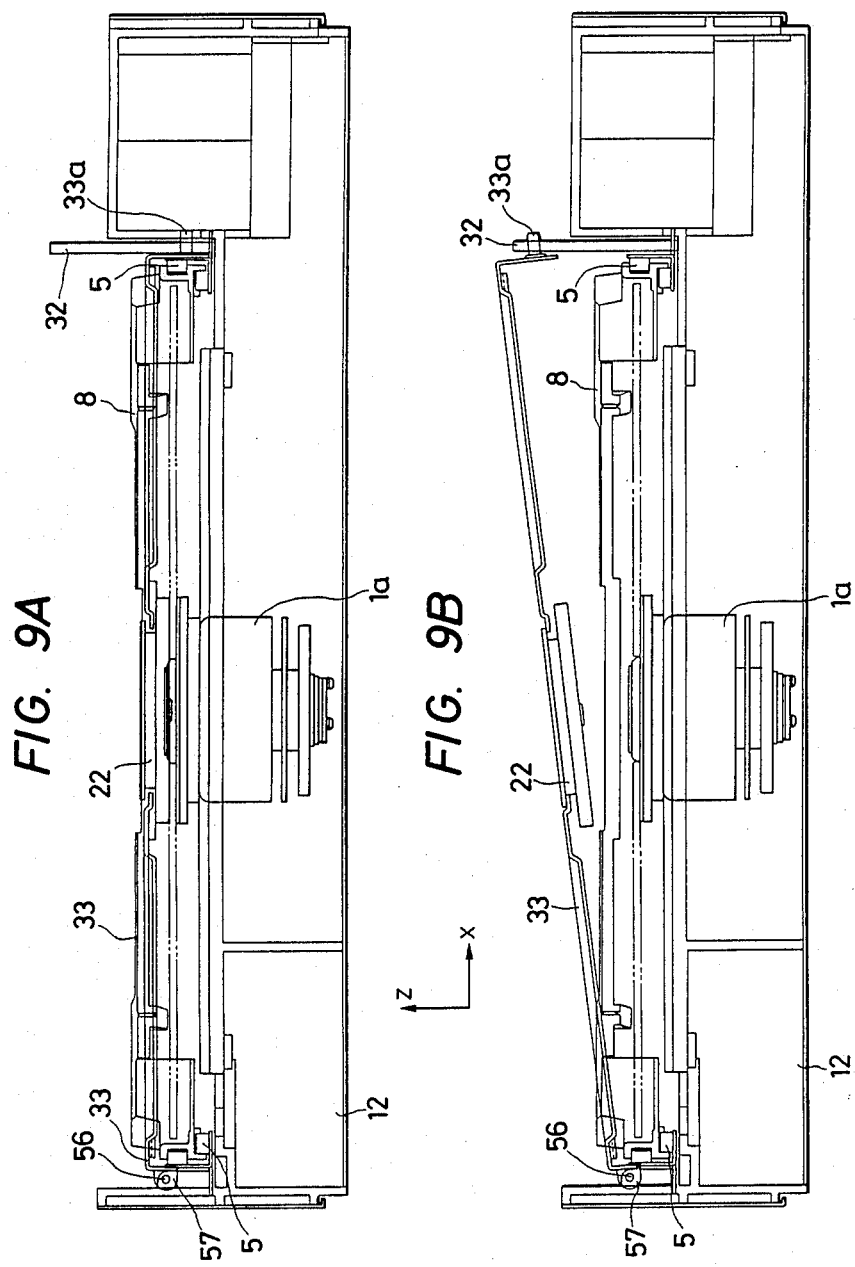

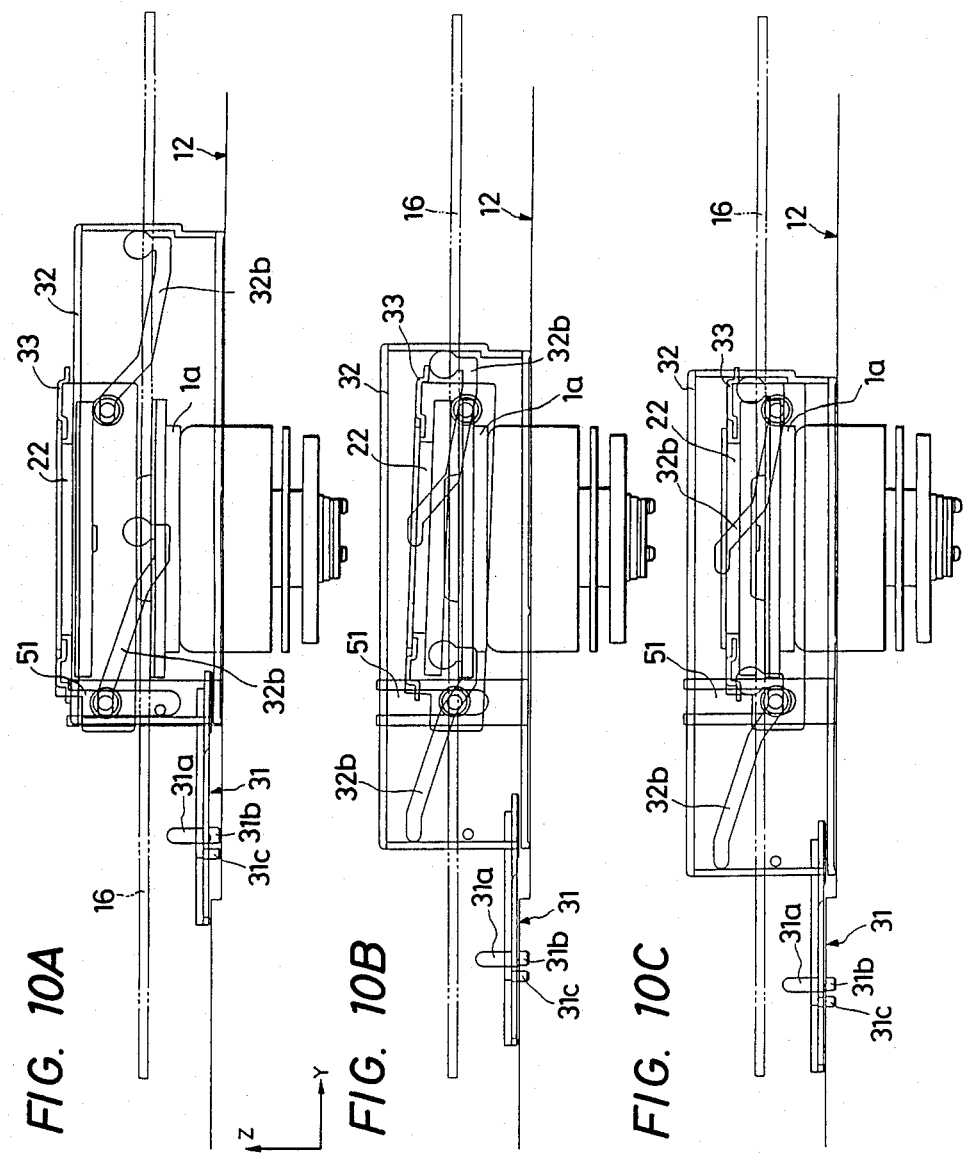

CLAMPER FOR DISK PLAYER

BACKGROUND OF THE INVENTION

The present invention relates to a clamper for a disk player, which functions so that a recording disk conveyed to a playback position in the body of the disk player by a loading mechanism is pinched in the playback position by a clamping means so as to be held while being rotated for playback.

Well-known is a disk player having a disk conveyor which functions so that a recording disk such as an audio recording disk having a groove in the surface of the disk or a digital audio recording disk recorded with a pulse code modulation signal is conveyed to a playback position while being held by a carriage. The carriage can be protruded out of or retracted into the body of the disk player. A loading mechanism, which is moved in a direction parallel with the disk supporting surface of a spindle motor and in another direction perpendicular to the supporting surface, to convey the recording disk, needs to be provided in order that the recording disk put on the carriage protruded out of the body of the disk player is placed in the playback position on the spindle motor. The loading mechanism requires a clamper which performs an accurate timed action in which a clamping means is moved down to pinch the recording disk on the spindle motor after the recording disk is placed thereon.

The present applicant proposed a clamper shown in FIGS. 1A and 1B. The clamper is such that a clamper holder D is supported by a support member C of a conveyor fitted on the right and left sub-chassis B of the body of a disk player so as to perform backward and forward movement of a recording disk G. The clamper holder D is moved in a manner timed with the movement of the support member C. The clamping means F of the clamper is moved up and down in conjunction with the placing movement of the recording disk G onto a spindle motor E. Since the conveyor and the clamper, which would originally function separately from each other, are integrally combined with each other in such a manner that the clamper is fitted on the support member C of the conveyor and the conveyor and the clamper act in conjunction with each other, it is easy to time the movement of the conveyor and that of the clamper to each other. However there are drawbacks in that the constitution of the conveyor is complicated and it is difficult to accurately position the clamper and provide an improper action preventive means because both the conveyor and the clamper move.

The present inventors then studied how to construct a conveyor and a clamper separately from each other. As a result, they developed a loading mechanism including new types of conveyors and clampers. One of the clampers is for clamping a disk at a proper time during loading wherein a support member C moves the loading mechanism but is not vertically moved, to place the recording disk in position.

The clamper of the loading mechanism according to the invention has first feature that the recording disk placed on a spindle motor is automatically and surely clamped thereon by utilizing the retraction of a carriage holding the recording disk. The whole loading mechanism is driven by a single motor. A force for driving the clamper is obtained by a means for applying a driving force to the conveyor. The clamper has a second feature that the mutually-connected timed movements of the conveyor and the clamper, the locking and unlocking of the conveyor and the clamper, the vertical movement of the clamper and the controlling of a series of movements of the conveyor and the clamper are all mechanically performed through a clamping cam, a locking lever, an action control cam groove and so forth. The clamper has a third feature that the conveyor and the clamper are basically constituted separately from each other to operate independently of each other through exclusive components to simplify the constructions of the conveyor and the clamper and ensure their proper operation. The clamper has a fourth feature that components having control functions including a locking function are provided to operate the clamper while always controlling it in a proper position at good timing.

SUMMARY OF THE INVENTION

Although the clamper has the above-mentioned features, the clamper also has a technical problem to be solved. The problem is that since the conveyor and the clamper are constituted separately from each other, their proper operation is ensured, but it is difficult to move the conveyor in conjunction with the movement of the clamper and to synchronize the actions of the conveyor and the clamper to each other. For that reason, the present inventors provided the clamper with components having control functions including the locking function. However, since the control functions are mechanically performed, a mechanical error such as idle displacement backlash, the hindrance of a smooth action due to the wear of mutually engaged or sliding parts or a resistant force and the wasting of energy arose as other problems to be solved. In other words, mutually conflicting requirements need to be met at the same time. One such requirement is causing the action control portion of the locking lever, which is engaged in the action control cam groove of a chassis, to properly follow a locking/unlocking cam surface which is a designed reference surface, to enable a highly accurate action. The other requirement is to reduce the wear of the action control portion and the locking/unlocking cam surface and the resistant force. This is another great technical problem to solve.

The present invention was made in order to solve the above-mentioned problems.

Accordingly, it is an object of the present invention to provide an improved clamper which is for a disk player and in which an urging means is provided in portions of components having control functions and the timing of the operation of the urging means is controlled so as to cause the urging means to operate at a prescribed time to enable both an accurate action for higher reliability and a completely-effective smooth movement.

The means for solving the above-mentioned problems is the improved clamper for the disk player in which a loading mechanism comprising a conveyor, which functions so that a carriage holding a recording disk is moved backward and forward in the directions of retraction and protrusion and is moved in a prescribed rear position toward a spindle motor to place the recording disk on the spindle motor, and the clamper for pinch-holding the disk on the spindle motor by a clamping means is provided in the body of the disk player, in which a playback means including the spindle motor, a pickup and a converter is built.

The clamper is characterized in that a locking lever is rotatably fitted on a clamping cam which is moved backward and forward with respect to a chassis in the body of the disk player to move a clamping means holder fitted with the clamping cam up and down to thereby clamp or unclamp recording disk on the spindle motor. The locking lever is provided with a driving force transmission portion and an action control portion. The driving force transmission portion is engaged with an operating means for transmitting a driving force in a timed manner. The action control portion is engaged in an action control cam groove provided in the chassis and having a locking portion and a locking/unlocking guide cam surface. When a timed driving force is applied to the locking lever by backward movement of the operating means in the direction of retraction, the action control portion of the locking lever is engaged and guided in the action control cam groove so that the locking lever is turned for unlocking and performs a backward movement in a prescribed position. When a timed driving force is applied to the locking lever by the forward movement of the operating means in the direction of protrusion, the action control portion of the locking lever is engaged and guided in the action control cam groove so that the locking lever performs a forward movement in a prescribed position and is turned for locking. The clamping cam, which is moved together with the locking lever, is moved backward and forward in a prescribed position in a timed manner along with the action of the locking lever so as to clamp the recording disk on the spindle motor in a timed manner. The clamper is fitted with the urging means which acts in a timed manner and includes an urging portion provided in an appropriate position on one of the locking lever and the chassis, which are components of the clamper, and an urging portion controller provided in an appropriate position on the other of the locking lever and the chassis. Only when the action control portion is in a front and rear positions wherein the action control portion is engaged with and disengaged from the locking portion of the action control cam groove, an urging force acts so that the action control portion operates while being in contact with the locking/unlocking guide cam surface of the action control cam groove.

According to the outline of the present invention; the urging means which acts in the timed manner is provided in the clamper in which the operating means for applying the driving force to the clamper, the chassis provided with an action control member, the clamping cam having a mechanism for converting a backward or forward movement into a placing movement, and the locking lever having a function of motive power transmission and a function of speed change movement and the clamping means holder which is an object of an action are assembled together so as to be moved in conjunction with each other. As a result, the timing and accuracy of the actions of the locking lever and the clamping cam are improved, and the smoothness and lightnesss (which leads to energy economization) of the movements of the locking lever and the clamping cam are enhanced.

When a driving force application means is driven so that the operating means of the improved clamper provided in accordance with the present invention and combined with the conveyor of the front loading type is moved backward in a direction reverse to that of an arrow Y shown in the drawings attached hereto, the conveyor is moved backward in the direction reverse to that of the arrow Y, so that the carriage holding the disk is retracted into the body of the disk player. After that, the conveyor is moved in direction reverse to that of another arrow Z shown in the drawings attached hereto for placing. The conveyor performs such a series of actions.

During the backward movement of the operating means of the clamper, the motive power transmission portion of the locking lever comes into contact with the operating means at an appropriate point of the locus of the backward movement so as to complete the formation of a motive power transmitting construction to obtain a driving force. After that, the driving forces are obtained by the backward and forward movements of the operating means so that the clamper sequentially performs various clamping actions such as unlocking, the downward movement of the clamping means holder, the generation and keeping of a clamping force, the elimination of the clamping force, the upward movement of the clamping means holders locking and the breakup of the motive power transmitting construction. In other words, the operating means is moved backward in the direction of retraction to apply the driving force to perform a series of clamping actions, and moved forward in the direction of protrusion to apply the other driving force to perform a series of clamping stoppage actions. In order to make these actions both accurate and smooth, sure contact with control references and guiding are executed only at the important points of the movements.

The operation of the clamper is described more concretely from now on. When the operating means is moved in the direction of retraction, the operating means comes into contact with the motive power transmission portion of the locking lever during the movement of the operating means to obtain a horizontal component force from the driving force applied in the direction of retraction, to turn the locking lever. Since the locking lever is thus turned, the action control portion thereof is disengaged from the locking portion of the action control cam groove to stop locking which prevents the movements in the direction of protrusion and retraction. When the operating means is moved further in the direction of retraction, a vertical component force is obtained from the driving force applied through the movement of the operating means, so that the locking lever engaged and guided in the action control cam groove is moved in the direction of retraction. Since the locking lever is fitted on the clamping cam, the clamping cam is also moved in the direction of retraction together with the locking lever to move down the clamping means holder. As a result, the clamping means fitted on the clamping means holder is moved down to pinch the recording disk on the spindle motor. As long as the clamping cam is not moved in the retractive position thereof, the clamping means remains moved down so that the clamping of the recording disk on the spindle motor is kept.

During the short period from the time when the locking lever is turned to disengage the action control portion thereof from the locking portion of the action control cam groove to stop the locking which prevents the movement in the directions of protrusion and retraction, to the time when the locking lever is subsequently moved in the direction of retraction, in the above-mentioned operation of the clamper, the urging portion guided by the urging portion controller applies an urging force to the locking lever so that the locking lever works while the action control portion thereof is in contact with the locking/unlocking guide cam surface and guided thereby, to control the clamping actions of the locking lever, the clamping cam and the clamping means holder which are disposed to be moved in conjunction with each other.

When the clamping of the recording disk on the spindle motor is to be stopped after the playback of the disk to take it out, the operating means is moved in the direction of protrusion to apply a driving force to cause clamping stoppage actions as described from now on. A vertical component force is obtained from the driving force of the operating means to move the clamping cam in the direction of protrusion together with the locking lever guided by the action control cam groove, to stop pinching the recording disk on the spindle motor by a clamping force and move up the clamping means holder. When the upward movement of the clamping means holder is completed, a horizontal component force is obtained from the driving force of the operating means to turn the locking lever to engage the action control portion thereof in the locking portion of the action control cam groove to lock the clamping cam so that it does not move backward nor forward.

During the period from the time when the locking lever is moved in the direction of protrusion to the vicinity of the position of termination of the movement while the action control portion of the locking lever is engaged in the action control cam groove, to the time when the locking lever is subsequently turned to engage the action control portion thereof in the locking portion of the action control cam groove, in the clamping stoppage operation of the clamper, the urging portion guided by the urging portion controller applies an urging force to the locking lever to put the action control portion in contact with the locking/unlocking cam surface of the action control cam groove and guide the action control portion by the locking/unlocking cam surface to control the clamping stoppage actions of the locking lever, the clamping cam and the clamping means holder which are disposed to be moved in conjunction with each other.

In addition, a vertical component force is obtained from the driving force of the operating means to put the locking lever out of contact with the operating means to break up the motive power transmitting construction and enable the operating means to move in the direction of protrusion, regardless of the clamper.

BRIEF DESCRIPTION OF THE DRAWINGS

FIG. 5A shows a side view of the clamper provided in the body of the disk player and fitted with a clamping means holder moved up;

FIG. 5B shows a side view of the clamper provided in the body of the disk player and fitted with the clamping means holder moved down;

FIG. 6A shows a plan view of components of the clamper, which are provided in the chassis of the disk player;

FIG. 6B shows a plan view of a component of the clamper, which is a locking lever;

FIG. 6C shows a plan view of a component of the clamper, which is a clamping cam;

FIG. 6D shows a plan view of a component of the clamper, which is provided in an operating means;

FIGS. 7A, 7B, 7C, 7D and 7E show plan views of assembled components of the clamper in sequential states of operation thereof;

FIG. 8 shows a partially-sectional side view of the magnetic circuit of a clamping means; and FIGS. 9A and 9B and 10A to 10C show modifications according to the invention.

DESCRIPTION OF THE PREFERRED EMBODIMENTS

An embodiment of the present invention, which is a clamper for a disk player, is hereafter described with reference to the drawings attached hereto.

Figures 1A, 1B:
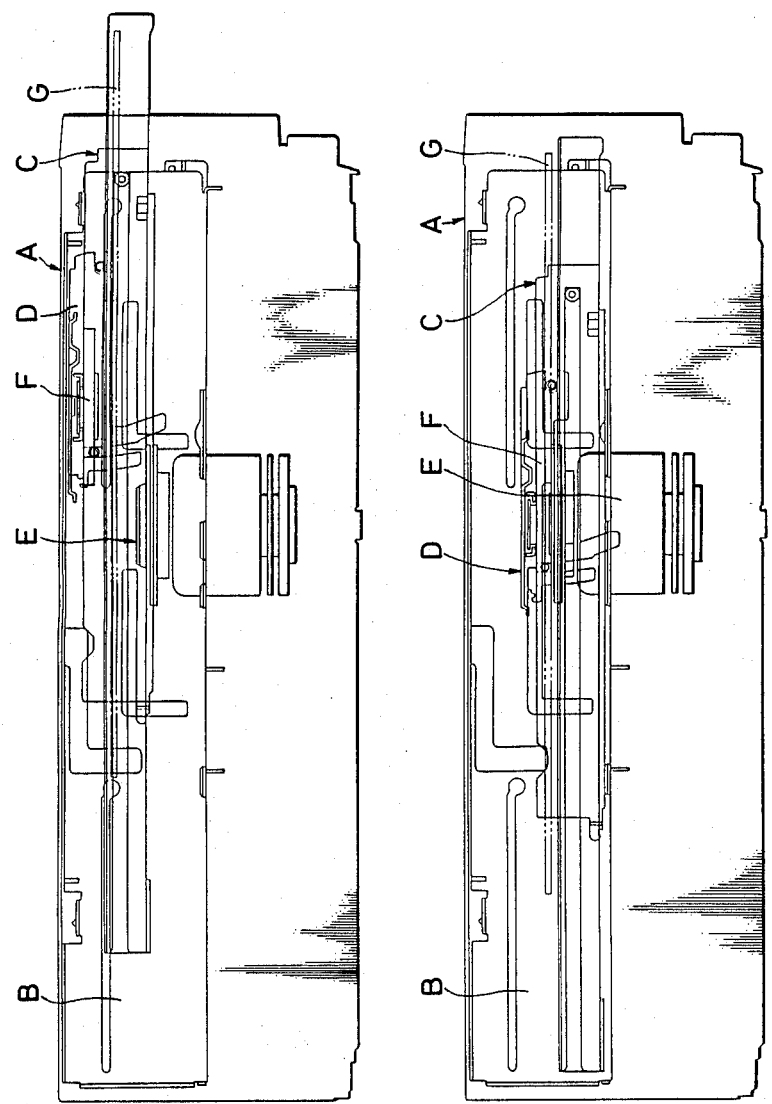
FIGS. 1A and 1B show side views of the clamper of a proposed loading mechanism.
Figure 2:
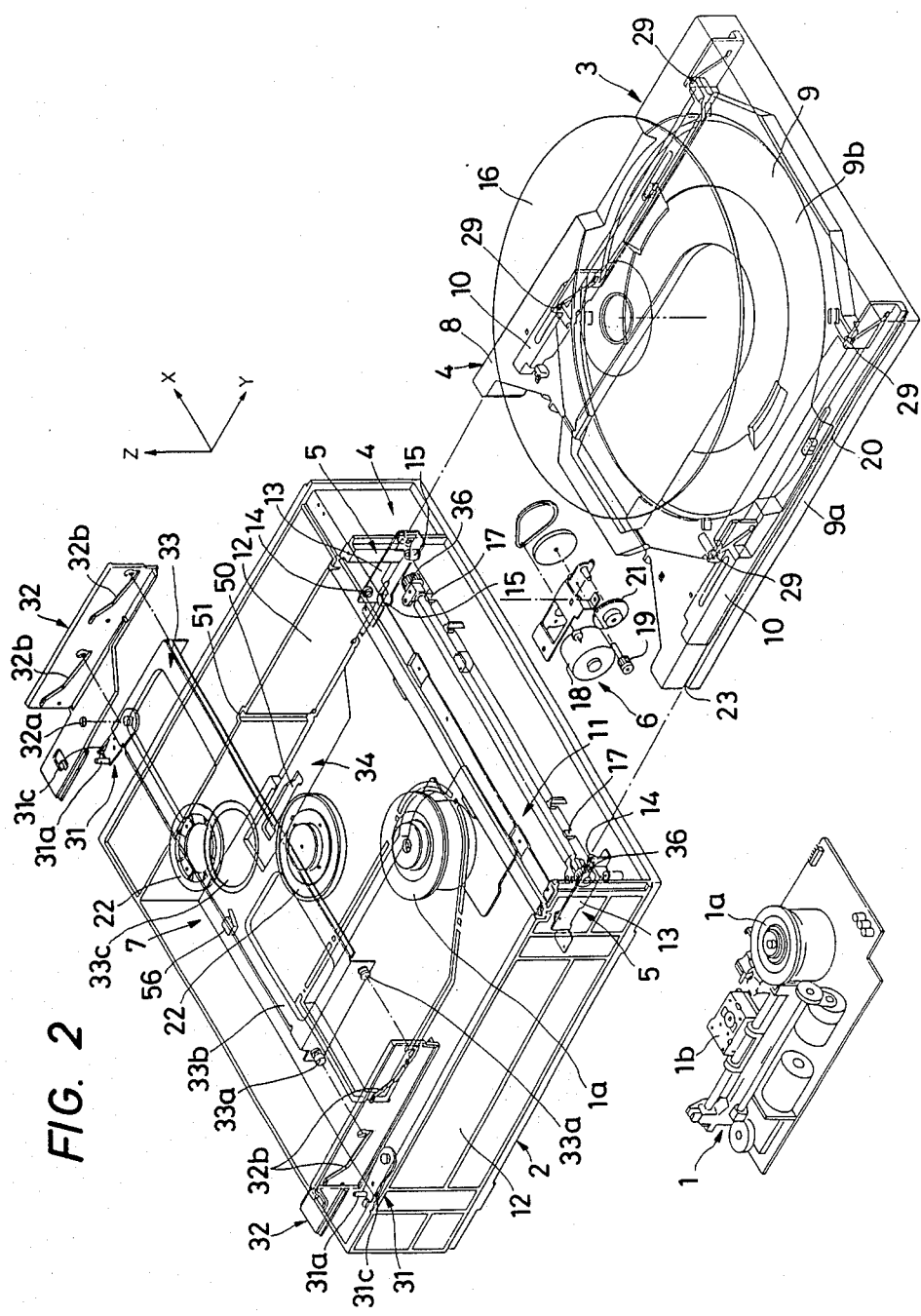
FIG. 2 shows a perspective view of a disk player provided with a clamper which is an embodiment of the present invention.

As shown in FIG. 2, a front loading disk player has a loading mechanism 4 comprising a clamper 7 in the body 2 of the disk player. A playback means 1 includes a spindle motor 1a and a pickup 1b. A carriage 3, which holds a recording disk 16 in front of the body 2 of the disk player and then carries the disk, is movable forward and backward in the direction (coincident with that of the arrow Y) of protrusion and the direction (reverse to that of the arrow Y) of retraction, respectively, by a conveyor means. The carriage 3 is also moved, in a prescribed internal position in the disk player body 2, toward the spindle motor 1a in a downward direction (reverse to that of the arrow Z), and away therefrom in an upward direction (in the direction of the arrow Z), by the conveyor means to place the disk 16 on the spindle motor 1a and take the disk away therefrom, respectively. After the disk 16 is placed on the spindle motor 1a, the disk is clamped thereon by a clamping means 22 of the clamper 7. A feature of this embodiment is an improved way of controlling the operation of the clamper 7 which is a part of the loading mechanism 4 of the disk player. The description herein is based on the assumption that the directions of arrows X, Y and Z shown in the drawings are forward, leftward and upward, respectively.

The constitution of the loading mechanism 4 is now outlined to clarify the relationship between the clamper 7 and the conveyor, their positions during loading operations and their basic constructions. As shown in FIG. 2, the loading mechanism 4 is of the separated type in which some of the components of the loading mechanism are disposed at the disk player body 2 and other components are disposed at the carriage 3. The components disposed at the disk player body 2 are a carriage support and guide means 5, a driving force application means 6 and the clamper 7. The other components disposed at the carriage 3 are a carriage frame 8, a container 9 and operating means 10.

The carriage support and guide means 5 is used for supporting the carriage 3 in a prescribed position as the carriage, inserted into the disk player body 2 from the front opening 11 thereof, is moved backward and forward to be retracted and protruded. The carriage support and guide means 5 comprise supports provided with vertical deviation restraint pins 14 and horizontal swing restraint rollers 15 on L-shaped plates 13 disposed at the right and left sides of the chassis 12 of the disk player.

The driving force application means 6 comprises a motor 18 as a source of driving power, an intermediate drive gear 19 for transmitting the turning force of the motor 18 and changing the speed of the rotation transmitted therefrom, and a drive gear 21 engaged with the intermediate drive gear 19 to apply a transmitted driving force to the drive rack 20 of the carriage 3. The driving force application means 6 is the only driver to cause all the actions of the loading mechanism 4.

The clamper 7 functions so that immediately after the carriage 3 holding the disk 16 is moved and placed in a playback position on the spindle motor 1a, the clamping means 22 is moved downwardly onto the disk to clamp it with a prescribed clamping force. The clamping means 22 is vertically moved at good timing. The clamping force is surely applied. These desirable actions of the clamper 7, which is a part of the loading mechanism 4 of the disk player and provided in the body 2 of the disk player, are performed through the constitution and operating mechanism of the clamper 7.

Figure 3:
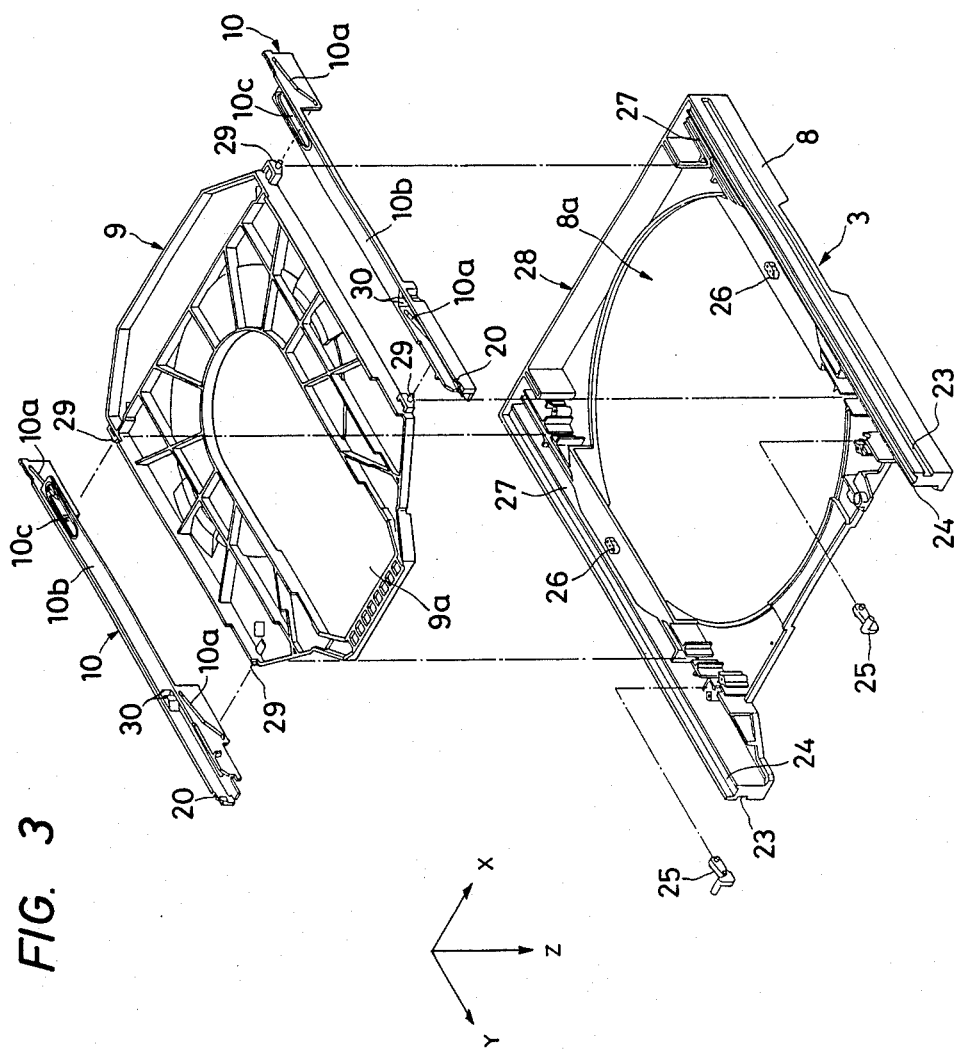
FIG. 3 shows a perspective view of components of the clamper, which are provided at a carriage.

The three components of the loading mechanism 4, which will disposed at the carriage 3, are now be described. As shown in FIG. 3, the center of the flat portion of the carriage frame 8 has a disk holding hole 8a for holding the disk 16 and guiding it in such a direction as to place the disk 16 on the spindle motor 1a. Each of the right and left sides of the carriage frame 8 is provided with a pin fitting groove 23 and a roller fitting groove 24 which corresponds to the vertical deviation restraint pin 14 and horizontal swing restraint roller 15 of the support 5 and in which the pin and the roller are fitted so that they are guided by the grooves. A locking pin 25 and an engaging portion 26 are provided on the bottom of the carriage frame 8 at each of the right and left sides thereof. The bottom of the carriage frame 8 is formed with an operating means fitting portion 27 at each of the right and left sides of the carriage frame. The carriage frame 8 is also formed with a cover wall 28.

The container 9 comprises a disk placing portion 9b having a playback means exposure opening 9a in the center of the portion, and engaging pins 29 projecting at intervals in the back-and-forth direction of the container at the right and left sides thereof, as shown in FIGS. 2 and 3. The container 9 is engaged in the oblique guide cam holes 10a of the operating means 10 so that the container is supported and guided by the oblique guide cam ( holes while being vertically moved to place the recording disk 16 on the spindle motor 1a.

Each operating means 10 is made of an elongated body 10b, and comprises the drive rack 20 formed on the bottom of the elongated body and extending in the back-and-forth direction of the operating means so that the drive rack is engaged with the drive gear 21, the oblique guide cam holes 10a located in front and rear positions and fitted with the engaging pins 29 of the container 9, a sliding guide groove 10c provided in the major portion 10c of the elongated body, and a clamping means actuation cam 30 located in contact with the motive power transmission pin 31a of a locking lever 31 provided under the operating means, as shown in FIGS. 2 and 3. The operating means 10 is slidably fitted in the carriage frame 8 by the length of the sliding guide groove 10c. When the carriage 3 is inserted into the body 2 of the disk player, the drive rack 20 is engaged with the drive gear 21 to move the carriage backward to retract it into the disk player body. After the backward movement of the carriage 3 is terminated by stoppers 17 shown in FIG. 2, the drive rack 20 acts to slide the operating means 10 backward further along the carriage frame 8.

The clamper 7 is now described in detail. The clamper is characterized in that it is capable of performing a well-timed vertical movement and applying a sure clamping force. Each of the forward and backward movements of the carriage 3 is used as a source of driving power for the clamper. The start and termination of the operation of the clamper, the application and keeping of the clamping force, the timing of the operation and so forth are all performed by mechanical means, not by electrical means such as a limiter. Mechanisms for causing the clamper to operate are all located on peripheral surfaces such as the side walls and top of the chassis 12 so that the mechanisms do not occupy much space. A locking mechanism acts to prevent the clamper from unexpectedly moving when the carriage 3 or the operating means 10 is not housed in a prescribed position in the body 2 of the disk player.

Since the clamper 7 shown in FIGS. 2, 3, 4, 5, 6, 7 and 8 is constituted symmetrically rightward and leftward with regard to the clamping means 22 for clamping the disk 16, only one of the right and left sections of the clamper is described from now on. As shown in FIGS. 2, 3, 4, 5 and 6, the clamper 7 is assembled so that the operating means 10 provided with the clamping means actuation cam 30 having a driving force application function, the chassis 12 provided with action controllers 34, a clamping cam 32 provided with a mechanism for converting a forward or backward movement into a placing movement, the locking lever 31 which functions to transmit motive power and change the speed of a movement, and a clamping means holder 33 which is an object of an action are moved in conjunction with each other.

The components of the clamper 7 will now be described. The clamping means actuation cam 30 capable of transmitting a driving force in the direction (reverse to that of the arrow Y) of retraction or in the direction (coincident with that of the arrow Y) of protrusion is provided in the operating means 10 which is a component of the conveyor. The operating means is moved backward by the driving force application means 6 to move the carriage 3 in the direction of retraction into the body 2 of the disk player and thereafter move the carriage toward the spindle motor 1a. As shown in FIG. 6D, the clamping means actuation cam 30 is provided in an appropriate position on the bottom of the rear portion of the operating means 10, and includes a retracting motive power transmission cam surface 30a capable of transmitting a driving force in the direction (reverse to that of the arrow Y) of retraction, and a protruding motive power transmission cam surface 30b capable of transmitting a driving force in the direction (coincident with that of the arrow Y) of protrusion. The operating means 10 has various components for performing a plurality of functions. One of the components of the clamper 7 is the clamping means actuation cam 30 provided in an appropriate position on the bottom of the rear portion of the elongated body 10b of the operating means 10. Another one of the components of the clamper 7 functions so that the drive rack 20 of the operating means 10 is engaged with the drive gear 21 to move the carriage 3 backward to retract it into the body 2 of the disk player; and the operating means 10 is slid backward further along the carriage frame 8 after the backward movement of the carriage 3 is terminated by the stopper 17.

Since the driving force application means 6, which comprises the drive motor 18, the intermediate drive gear 19, the drive gear 21 and synchronizing gears 36 provided at the right and left ends of a rotary shaft, acts to slide the operating means 10 backward and forward in a rear position, the driving force application means is an indirect component of the clamper 7.

Figure 4:
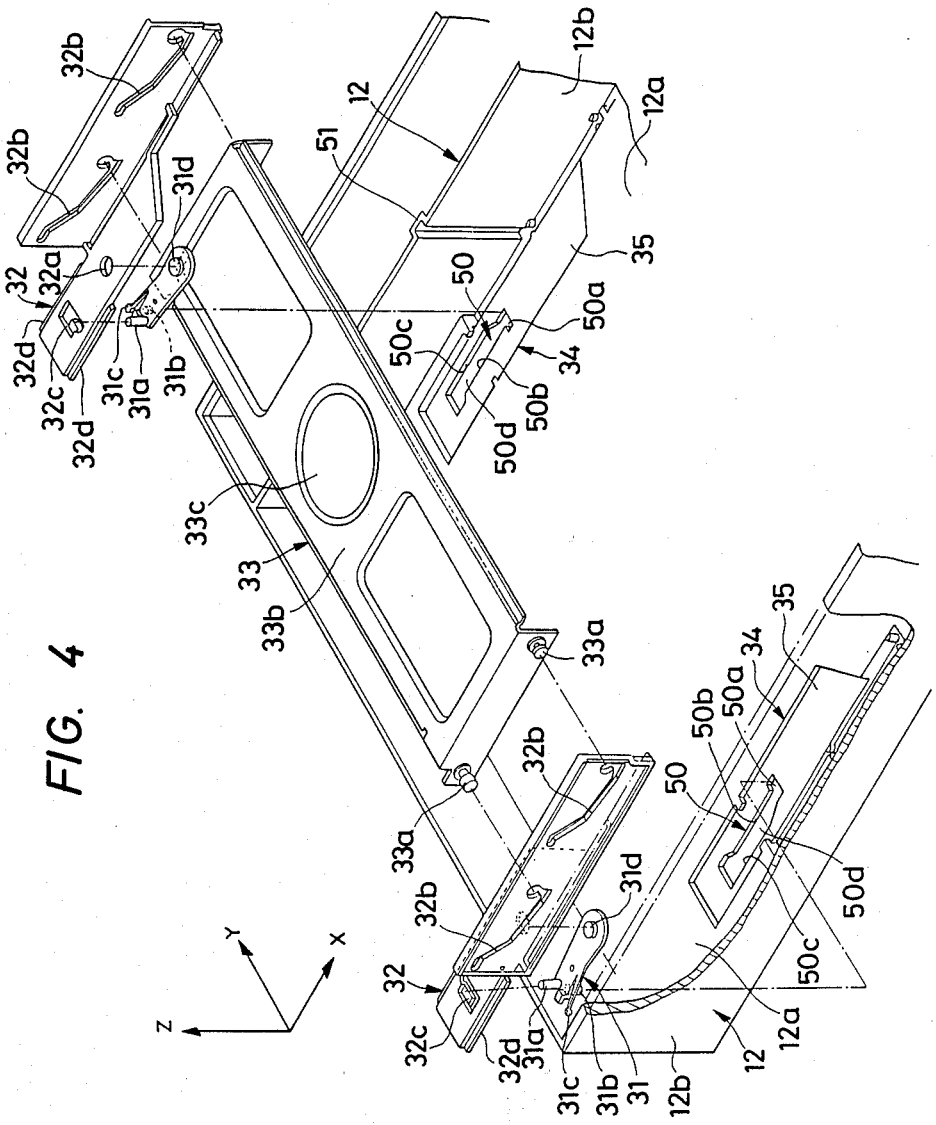
FIG. 4 shows a perspective view of major parts of components of the clamper, which are provided in the body of the disk player.

Still other ones of the components of the clamper 7 are the action controllers 34 provided in the chassis 12 disposed in the body 2 of the disk player. As shown in FIGS. 2, 4 and 6, the action controllers 34 are an action control cam groove 50 which has a locking portion 50a at one end of the groove and in which an action control portion 31b (which is shaped as a pin in the embodiment and therefore referred to as action control pin hereinafter) is engaged and guided, and a placing movement guide groove 51 in which the clamping means holder 33 is engaged and guided to be moved up and down. The action control cam groove 50 is provided in the horizontal portion 12a of the chassis 12, while the placing movement guide groove 51 is provided in the vertical portion 12b of the chassis 12. The horizontal portion 12a of the chassis 12 has a clamping cam sliding recess 35 in which the clamping cam 32 described further hereinafter is slidably fitted. As shown in FIG. 6A, the action control cam groove 50 comprises a guide groove portion 50d in which the action control pin 31b is fitted and moved, a locking/unlocking guide cam surface 50b provided at one side edge of the guide groove portion, an urging force application guide cam surface 50c provided at the other side edge of the guide groove portion 50d, and the locking portion 50a provided at the front end of the urging force application guide cam surface. The locking/unlocking guide cam surface 50b is designed as a reference surface for guiding or controlling the direction and timing of operation of the action control pin 31b, the engagement and disengagement thereof to and from the locking portion 50a, and so forth. The urging force application guide cam surface 50c is designed as a reference surface which is an urging portion controller to perform urging to guide the action control pin 31b in a timed manner, only for a necessary time while the action control pin is in contact with the locking/unlocking guide cam surface 50b. Each of the action controllers 34 provided in the chassis 12 to serve as components of the clamper 7 has a function of controlling the operation of the clamper.

As shown in FIGS. 2, 3, 4, 5 and 6, the clamping cam 32 is fitted so that it is slidable in the directions of protrusion and retraction, over the clamping cam sliding recess 35 of the chassis 12. The clamping cam 32 has vertical movement guide cam holes 32b in which the engaging projections 33a of the clamping means holder 33 are engaged to move it up and down. As shown in FIGS. 4, and 6D, the clamping cam 32 is a plate L-shaped along the form of the chassis 12, and has the vertical movement guide cam holes 32b in the vertical portion 32e of the clamping cam. The vertical movement guide cam hole 32b is a through hole consisting of a small-inclination part and a large-inclination part which extend in the direction of a vertical movement. The clamping means holder 33 fitted in the vertical movement guide cam hole 32b is vertically moved by the rightward and leftward movement of the vertical movement guide cam hole 32b. The horizontal portion of the clamping cam 32 has a locking lever pivot fitting hole 32a for pivotally coupling the locking lever 31 in a turnable manner, a through opening 32c for a motive power transmission pin, and sliding guide projections 32d at the side edges of the horizontal portion. The clamping cam is a component of the clamper 7, and has such a vertical movement function that the clamping cam is caused, by a driving force based on the backward or forward movement of the operating means 10, to perform a prescribed quantity of well-timed movement in the direction of retraction or protrusion to convert the movement into the well-timed vertical movement of the clamping means holder 33.

As shown in FIGS. 2, 5 and 6B, the locking lever 31 is fitted in the locking lever pivot fitting hole 32a of the clamping cam 32 so that the locking lever is turnable. The locking lever 31 has a pivot projection 31d provided at the butt of the plate-shaped lever so as to serve as a rotation fulcrum. A motive power transmission portion 31a (which is shaped as a pin in the embodiment and therefore referred to as motive power transmission pin, hereinafter), which is located in contact with the clamping means actuation cam 30 of the operating means 10 to transmit a driving force, and the action control pin 31b, which is engaged in the action control cam groove 50 and located in contact with the locking/unlocking guide cam surface 50b to transmit a movement speed change instruction therefore, are provided at the free tip of the locking lever 31. The motive power transmission pin 31a projects into the clamping cam 32, extends through the through opening 32c of the clamping cam, and is engaged with the clamping means actuation cam 30 of the operating means 10. The action control pin 31b projects into the chassis 12, and is engaged in the action control cam groove 50. The locking lever 31 is provided with an urging portion 31c at the side edge of the locking lever so that the urging portion pushes the action control pin 31b on the locking/unlocking guide cam surface 50b. The locking lever is a component of the clamper 7, and functions to transmit motive power to the clamper and change the speed of the movement of each of other components of the clamper.

As shown in FIGS. 2 and 4, the clamping means holder 33 is made of a plate 33b having such a length that the plate corresponds to the vertical portions of the right and the left chassis. The clamping means 22 is attached to the center of the plate 33b at the clamping means attaching portion 33c thereof. The clamping means holder 33 is provided with two engaging projections 33a at each end of the clamping means holder. The engaging projections 33a are located at a distance from each other correspondingly to the vertical movement guide cam holes 32b of the clamping cam 32, and engaged in the holes. One of the two engaging projections 33a is slender and engaged in the vertical guide groove 51 of the vertical portion 12b of the chassis 12 so that the projection is restricted to allow the clamping means holder 33 to move only vertically. As shown in FIG. 8, a magnet 52 and a yoke 53 are attached to the bottom of the clamping means 22, and form a magnetic circuit 55 together with a magnetic plate 54 attached to the spindle motor 1a, to apply the clamping force to the disk 16.

The components of clamper 7 are combined together so as to act, as described from now on. The chassis 12 is provided with the action controllers 34 so that the clamping cam 32 fitted with the locking lever 31 is slidably supported over the clamping cam sliding recess 35. The operating means 10 is moved backward and forward in the directions of retraction and protrusion, over the clamping cam 32. The clamping cam 32 is engaged with the clamping means holder 33. Usually, the action control pin 31b of the locking lever 31 is engaged in the locking portion 50a of the action control cam groove 50, and the motive power transmission pin 31a is located within the stroke of the backward and forward movement of the operating means 10. Although the locking lever 31 is located under the clamping cam 32 and fitted between the clamping cam 32 and the chassis 12 in the embodiment, the present invention is not confined thereto but may be otherwise embodied so that the locking lever is located over the clamping cam. The urging portion 31c of the locking lever 31 is set so that the urging portion is not urged when the action control pin 31b is engaged in the locking portion 50a of the action control cam groove 50.

The assembly and operation of the components of the clamper 7 are described from now on. When the operating means 10 is moved in the direction of retraction, the clamping means actuation cam 30 comes into contact with the locking lever 31 to turn the lever to disengage the action control pin 31b from the locking portion 50a of the action control cam groove 50 to thereby allow movement in the directions of protrusion and retraction. Subsequently, the clamping cam 32 is moved in the direction of retraction, through the action of the locking lever 31 engaged and guided in the action control cam groove 50, to move down the clamping means holder 33 engaged with the clamping cam, to pinch the recording disk 16 on the spindle motor 1a by the clamping means 22 fitted on the clamping means holder. In other words, the clamping cam 32 and the clamping means holder 33 are moved in conjunction with each other by the turning and backward movement of the locking lever 31 to clamp the recording disk 16 on the spindle motor 1a. During the short period from the time when the locking lever 31 is turned to disengage the action control pin 31b from the locking portion 50a of the action control cam groove 50 to cause unlocking to start the movement in the direction of retraction, to the time when the movement in the direction of retraction is actually started, in the above-mentioned clamping operation, the urging portion 31c guided by the urging force application guide cam surface 50c which is an urging portion controller applies an urging force to the locking lever 31 so that the action control pin 31b operates while being in contact with the locking/unlocking guide cam surface 50b and guided thereby, to control the clamping actions of the locking lever 31, the clamping cam 32 and the clamping means holder 33 which are moved in conjunction with each other.

After the disk 16 is clamped on the spindle motor 1a, the operating means 10 is moved in the direction (coincident with that of the arrow Y) of protrusion to move the clamping cam 32 forward through the action of the locking lever 31 guided by the action control cam groove 50, together with the locking lever, to stop pinching the recording disk on the spindle motor and move up the clamping means holder 33. When the upward movement of the clamping means holder 33 is completed, the locking lever 31 is turned to lock the clamping cam 32 so that it does not move backward nor forward. During the period from the time when the action control pin 31b of the locking lever 31 is moved to the vicinity of the position of termination of the movement in the direction of protrusion while being engaged in the action control cam groove 50, to the time when the locking lever is subsequently turned to engage the action control pin in the locking portion 50a of the action control cam groove 50, in the above-mentioned clamping stoppage operation of the clamper 7, the urging portion 31c guided by the urging force application guide cam surface 50c which is the urging portion controller applies an urging force to the locking lever to bring the action control pin into contact with the locking/unlocking guide cam surface 50b of the action control cam groove 50 and guide the pin by the surface to control the clamping stoppage actions of the components of the clamper 7, which are moved in conjunction with each other.

The locking lever 31 can be put out of contact with the clamping means actuation cam 30 to allow the operating means 10 to move in the direction of protrusion, regardless of the clamper 7.

The action controllers of the clamper 7 are now described in detail. This embodiment is also characterized in that an urging means is provided in an appropriate position on the locking lever 31 which has a control function and is one of the components of the clamper 7; an urging means controller is provided in an appropriate position on the chassis 12 which is another one of the components of the clamper; and the urging means controller acts while being in contact with the locking/unlocking guide cam surface 50b. This novel constitution of the embodiment is concretely described from now on, with reference to the drawings attached hereto. As shown in FIG. 5, the urging portion 31c projects from the locking lever 31, the action control pin 31b is engaged in the action control guide cam groove 50, and the distance $\alpha$ between the locking/unlocking guide cam surface 50b and the urging force application guide cam surface 50c is made larger than the width $\beta$ from the action control pin 31b to the urging portion 31c. However, the distance $\alpha'$ between the locking/unlocking guide cam surface 50b and the urging force application guide cam surface 50c at the front portion (as to the direction of the arrow Y) of the action control guide cam groove 50 is made smaller than the width $\beta$. A recessed locking portion is provided at the front end (as to the direction of the arrow Y) of the locking/unlocking guide cam surface 50b of the action control guide cam groove 50. The action control pin 31b and urging portion 31c of the locking lever 31 are engaged in the action control guide cam groove 50. When the action control pin 31b is located in the rear portion of the action control guide cam groove 50 at the larger distance $\alpha$, there is a clearance Y so that the urging portion 31c does not apply the urging force. When the action control pin 31b is located near the front locking portion 50a of the action control guide cam groove 50, the urging portion 31c applies the urging force to push the action control pin 31b on the locking/unlocking guide cam surface 50b. When the action control pin 31b is engaged in the locking portion 50a of the action control guide cam groove 50, the urging portion 31c does not apply the urging force, again.

The urging portion 31c and the urging force application guide cam surface 50c are provided for the locking lever 31 in order to prevent a trouble described from now on. If the urging means were not provided, the locking lever 31 would be turned to disengage the action control pin 31b thereof from the locking portion 50a of the action control cam groove 50 of the chassis 12 to disengage the motive power transmission pin 31a of the locking lever and the operating means 10 from each other or the clamping cam 32 would be moved to displace the clamping means 22 downward before the retraction of the carriage 3 into the body 2 of the disk player, when an unexpected vibration or shock acted to the body of the disk player as the carriage was not completely retracted in the body of the player. This is the trouble.

Although the locking lever 31 and the chassis 12 are provided with the urging means and the urging means controller, respectively, in the embodiment, the present invention is not confined thereto but may be otherwise embodied so that the chassis and the locking lever are provided with the urging means and the urging means controller, respectively.

If the urging portion 31c always applied the urging force to push the action control pin 31b on the locking-/unlocking guide cam surface 50b, the urging portion would be always loaded so that the spring part thereof would be likely to lose the spring stiffness thereof due to a creep deformation, wear or the like. If the spring stiffness were high, energy would be wasted because of the hindrance of the smooth and light clamping operation of the clamper 7. According to the present invention, the urging means is provided to prevent an improper action, and an improvement is made to prevent the performance and durability of the urging portion 31c from falling and prevent the resistance to the pushing by the urging force of the urging portion from making it difficult to cause a movement or from making it necessary to apply more than an appropriate force to cause the movement.

The operation of the embodiment having the above-described constitution will now be described in detail. A driving force is applied by moving the operating means 10 in the direction of retraction, to cause a series of clamping actions. Another driving force is applied by moving the operating means 10 in the direction of protrusion, to cause a series of clamping release actions.

As shown in FIG. 7A, the driving force application means 6 is operated to move the operating means 10 in the direction (reverse to that of the arrow Y) of retraction to bring the clamping means actuation cam 30 into contact with the locking lever 31 to complete the formation of a motive power transmitting construction for applying the driving force from the driving force application means 6 which is the sole source of driving power in the loading mechanism 4.

During the period from the initial time when the carriage 3 is not retracted in the body 2 of the disk player, to the time when the formation of the motive power transmitting construction is completed, the urging means is in such a state that the clearance Y is present between the tip of the urging portion 31c of the locking lever 31 and the action control cam groove 50 of the chassis 12 and the urging portion is not loaded.

As shown in FIG. 7B, the clamping means actuation cam 30 of the operating means 10 is slightly moved in the retraction direction while being in contact with the locking lever 31. During further movement of the operating means 10 the direction of retraction, the retracting motive power transmission cam surface 30a of the clamping means actuation cam 30 comes into contact with the motive power transmission pin 31a of the locking lever 31 to obtain a horizontal component from the transmitted driving force to turn the locking lever as shown by an arrow H. At that time, since the cam surface 30a is oblique to the directions of the backward and forward movement and is in contact with the pin 31a, the action control pin 31b is turned by a driving force in a direction oblique to the pin, so that the pin is disengaged from the locking portion 50a of the action control cam groove 50 to allow movement in the directions of protrusion and retraction. In that case, the urging portion 31c comes into contact with the urging force application guide cam surface 50c of the action control cam groove 50 and bends to apply the urging force to the locking lever 31. As a result, the action control pin 31b is surely brought into pressure contact with the locking/unlocking guide cam surface 50a at the time of unlocking operation so as to control the timing of the movement of the locking/unlocking guide cam surface and regulate the play thereof.

As shown in FIG. 7C, the clamping means actuation cam 30 of the operating means 10 is moved further in the retraction direction while being in contact with the locking lever 31. When the operating means 10 is thereafter moved further in the direction of retraction, a vertical component force is obtained from the driving force of the operating means to move the clamping cam 32 in the direction of retraction through the action of the locking lever 31 guided by the action control cam groove 50. The vertical movement guide groove 51 and the vertical movement guide cam hole 32b, in which the engaging projection 33a (FIGS. 5A and 5B) is engaged, act to limit the movement of the clamping means holder 33 to be only a vertical movement based on the movement of the clamping cam 32. As a result, the clamping means 22 attached to the clamping means holder 33 is moved down and placed on the disk 16 to clamp the disk on the spindle motor 1a by the attractive force of the magnetic circuit 55 in the clamping means, as shown in FIG. 8. The rear end of the operating means 10 then comes into contact with a clamping completion switch 56 (FIGS. 9A, 9B) secured to the chassis 12, to push the switch to stop the motor 18 driving the operating means. The clamping of the disk 16 on the spindle motor 1a is thus completed. As a result, as long as the motor 18 is not started to move the operating means 10 to move the clamping cam 32 from the retracted position thereof, the clamping means 22 remains down to maintain clamping, as shown in FIG. 5B.

When the clamping of the disk 16 on the spindle motor 1a is completed, the action control pin 31b is guided by the guide groove portion 50d of the action control cam groove 50 so that the pin 31b is moved in the direction of retraction. Because of the smaller width α' of the action control cam groove 50 immediately after the unlocking, the urging portion 31c is loaded. However, because of the larger width α of the action control cam groove 50 long after the unlocking, the clearance γ is formed so that the urging portion 31c is not loaded.

As shown in FIG. 7D, the clamping means actuation cam 30 of the operating means 10 is slightly moved in the direction (coincident with that of the arrow Y) of protrusion while being in contact with the locking lever 31.

When the playback of disk 16 is completed, the operating means 10 is moved in the direction of protrusion in order to unclamp the on the spindle motor 1a, to take out the disk. As a result, the 31a of the locking lever 31 is brought into contact with the protruding motive power transmission cam surface 30b to complete the formation of a driving force application construction to stop clamping the disk 16 on the spindle motor 1a.

As shown in FIG. 7E, the clamping means actuation cam 30 of the operating means 10 is moved in the direction of protrusion while being in contact with the locking lever 31.

The action control pin 31b is brought into contact with the protruding motive power transmission cam surface 30b of the operating means 10 to obtain a vertical component force from the driving force of the operating means to move the clamping cam 32 forward together with the locking lever 31 guided by the action control cam groove 50. As a result, the downward pressure of the clamping means holder 33 is reduced to stop pinching the disk 16 on the spindle motor 1a by the clamping force. The clamping means holder 33 is then moved up. Since the protruding motive power transmission cam surface 30b is oblique to the directions of protrusion and retraction, both the vertical component force and a horizontal component force can be obtained through the cam surface 30b.

When the upward movement of the clamping means holder 33 is completed, the horizontal component force is obtained from the driving force of the operating means 10 to turn the locking lever 31 to engage the action control pin 31b in the locking portion 50a of the action control cam groove 50 to lock the clamping cam 32 so that it does not move backward nor forward. At that time, the state of the urging means becomes as described from now on. When the action control pin 31b is in the larger width $\alpha$ of the action control cam groove 50 at first, the clearance $\gamma$ is made so that the urging portion 31c is not loaded. When the action control pin 31b is thereafter moved to the smaller width $\alpha'$ of the action control cam groove 50, the urging portion 31c comes into contact with the urging force application guide cam surface 50c of the action control cam groove so as to bend to be loaded until the action control pin is engaged in the locking portion 50a of the action control cam groove. Control is thus executed to perform locking at accurate timing.

The operating means 10 is moved further in the direction of protrusion to obtain the vertical component force from the driving force of the operating means to put the locking lever 31 out of contact with the clamping means actuation cam 30 to break up the motive power transmitting construction. As a result, the operating means 10 is made free so that it can move in the direction of protrusion, regardless of the clamper 7. At that time, the initial state of the clamper 7 is established again, and the urging means is locked in the unloaded condition. Even if unexpected vibration or shock acts on the urging means while locked in the unloaded condition, the locking lever 31 is not turned for unlocking.

Another embodiment of the invention will now be described with reference to FIGS. 9 and 10.

In the foregoing embodiment, the clamping means such as clamping cams and locking levers are arranged symmetrically on both the sides of the chassis 12 to thereby raise and descend the clamper holder simultaneously on both sides. However, it is apparent that the invention is not limited thereto or thereby.

As shown in FIGS. 9A and 9B, the retainer projection is provided only on one side of the clamper holder 33, and a pivot shaft 56 is provided at the other side, so that the clamper holder 33 may be rotated around a shaft bearing 57. With such a structure, it is possible to reduce the number of the mechanical parts, and also to mount the clamper holder 33 by the rotation under one degree of freedom. It is therefore possible to enhance the positional precision during the clamping operation and the reliability of the operation.

Also, in the first embodiment of the invention, a pair of the vertical movement guide cam slots 32b of the clamp cam 32 are in the same form, so that the clamper 22 is moved in parallel without changing its posture. However, as shown in FIG. 10, the vertical movement guide cam slots 32b have different shapes so that the clamper holder 33 and the clamper 22 are raised from one end. In the first embodiment, the clamping force is generated by the magnetic circuit 55, so that when the clamper 22 is raised, it is necessary to apply a large force for separating the magnet 52 and the plate 54 in the parallel condition. However, according to the cam arrangement shown in FIG. 10, it is possible to reduce the necessary loads.

A clamper provided for a disk player in accordance with the present invention is constituted so that a locking lever is fitted in a turnable manner on a clamping cam which is moved backward and forward in a prescribed position along a chassis in the body of the disk player to move up and down a clamping means holder fitted with the clamping cam, to clamp a recording disk on a spindle motor; the locking lever is provided with a driving force transmission portion and an action control portion; the driving force transmission portion is engaged with an operating means for transmitting a driving force in a timed manner; the action control portion is engaged in an action control cam groove provided in the chassis and having a locking portion and a locking-/unlocking guide cam surface; when a timed driving force is applied to the locking lever by the backward movement of the operating means in the direction of retraction, the action control portion of the locking lever is engaged and guided in the action control cam groove so that the locking lever is turned for unlocking and performs a backward movement in a prescribed position; when a timed driving force is applied to the locking lever by the forward movement of the operating means in the direction of protrusion, the action control portion of the locking lever is engaged and guided in the action control cam groove so that the locking lever performs a forward movement in a prescribed position and is turned for locking; the clamping cam, which is moved together with the locking lever, is moved backward and forward in a prescribed position in a timed manner along with the action of the locking lever so as to clamp the recording disk on the spindle motor in a timed manner; an urging portion is provided in an appropriate position on one of the chassis and the locking lever which are components of the clamper; an urging portion controller is provided in an appropriate position on the other of the chassis and the locking lever; and only when the action control portion of the locking lever is in a front and a rear positions wherein the action control portion is engaged with and disengaged from the locking portion of the action control cam groove, an urging force acts so that the action control portion operates while being in contact with the locking/unlocking guide cam surface of the action control cam groove. For that reason, the clamper has features which a conventional clamper does not have.

The first feature is that it is easy to cause the backward and forward movement of a carriage and the placing movement of a container in a mutually timed manner, because the operating means is used as a source of driving power for the timing of the operation of the clamper.

The second feature is that almost all the actions of the clamper are mechanically caused; the mechanisms for the actions are provided in narrow spaces along peripheral surfaces such as the side surfaces and top of the disk player not to occupy the central space of the disk player; and the entire form of the clamper is thus made useful to render the clamper compact.

The third feature is that the locking lever is fitted in the turnable manner on the clamping cam and provided with the driving force transmission portion and the action control portion; the driving force transmission portion is engaged with the operating means for transmitting the driving force in the timed manner; the action control portion is engaged in the action control cam groove provided in the chassis and having the locking portion and the locking/unlocking guide cam surface; when the timed driving force is applied to the locking lever by the backward movement of the operating means in the direction of retraction, the action control portion of the locking lever is engaged and guided in the action control cam groove so that the locking lever is turned for the unlocking and performs the backward movement in the prescribed position; when the timed driving force is applied to the locking lever by the forward movement of the operating means in the direction of protrusion, the action control portion of the locking lever is engaged and guided in the action control cam groove so that the locking lever performs the forward movement in the prescribed position and is turned for the locking; and the clamping cam, which is moved together with the locking lever, is moved backward and forward in the prescribed position in the timed manner along with the action of the locking lever to clamp the recording disk on the spindle motor in the timed manner. For that reason, the clamping operation and clamping stoppage operation of the clamper are prevented from being improperly performed, but are executed at good timing, always under control.

The urging portion is provided in the appropriate position on one of the locking lever and the chassis which are components of the clamper having the above-mentioned features. The urging portion controller is provided in the appropriate position on the other of the locking lever and the chassis. Only when the action control portion of the locking lever is in the front and the rear positions wherein the action control portion is engaged with and disengaged from the locking portion of the action control cam groove, the urging force acts so that the action control portion operates while being in contact with the locking/unlocking guide cam surface of the action control cam groove. As a result, the urging portion is surely caused to work at the important time point of the operation of the clamper so that a reliable action is performed at good timing. Besides, the load on the urging portion is minimized to reduce the consumption of energy due to providing the urging portion and diminish the fall in the spring stiffness of the urging portion and the creep deformation and wear thereof to lengthen the life of the urging portion.

The clamper is provided with a mechanical control mechanism for improving the timing and accuracy of the operation of the clamper. The clamper is also provided with the urging means for causing the mechanical control mechanism to surely work. Besides, technical problems that a mechanical accuracy error and play would occur due to providing the urging means, the life of the urging portion would be short due to the fall in the spring stiffness thereof and the deformation and wear of the urging portion and the urging force of the urging means would hinder the operation of the clamper are solved. As a result, the cost of the clamper is reduced, its size and shape are effectively used, and its performance is greatly improved.

We claim:

1. A clamper mechanism for a disk player having a housing comprising a chassis, a playback mechanism mounted in said housing for playing back a recording disk, said playback mechanism including a spindle motor for supporting said disk, a carriage mounted in said housing for movement relative to said chassis in a retraction direction to a second position proximate said spindle motor, and means for moving said carriage between said first and second positions, said clamper mechanism being adapted for clamping said disk to said spindly motor, and said clamper mechanism comprising:

a clamp movable between a clamping position at which said disk is clamped to said spindly motor and a non-clamping position at which said clamp is clear of said disk;

holding means for holding said clamp;

a first clamper cam mechanism (30) mounted for movement in said retraction direction with respect to said carriage when said carriage is in said second position; and a second clamper cam mechanism (32) mounted in said housing for movement in said retraction direction with respect to said chassis, and having a clamp holder cam portion, and a locking lever (31) pivotably mounted thereon, said locking lever having a driving force transmission member (31a), and an action control member (31b), wherein said chassis has an action control cam groove formed therein with a locking portion (50a) for engaging said action control member to prevent motion of said locking lever and thereby said second clamper cam mechanism relative to said chassis in said retraction direction, said first clamper cam mechanism further includes a power transmission cam surface (30a) for engaging said driving force transmission member (31a) to disengage said action control member (31b) from said locking portion (51a), in response to movement of said first clamper cam mechanism with respect to said carriage in said retraction direction so that said locking lever and said second clamper cam mechanism are movable together in said retraction direction in response to further movement of said first clamper cam mechanism in said retraction direction, and said holding means has a cam member (33a) for engaging said clamp holder cam portion (32b) of said second clamper cam mechanism for moving said holding means from said non-clamping position to said clamping position in response to said further movement of said first clamper cam mechanism.

2. A clamper mechanism of claim 1, wherein said locking lever further comprises an urging member (31c), and said action control cam groove further comprises a locking/unlocking guide cam surface (50b) for guiding said action control cam member of said locking lever during said further movement of said first clamper cam mechanism, and an urging cam surface (50c) for engaging said urging member to bias said action control portion into said locking portion.

3. The clamper mechanism of claim 2, wherein said urging cam surface is shaped for releasing engagement with said urging member during said further movement of said first clamper cam mechanism.

4. The clamper mechanism of claim 1, wherein said locking lever further comprises an urging cam surface, said action control cam groove further comprises a locking/unlocking guide cam surface (50b) for guiding said action control cam member of said locking lever during said further movement of said first clamper cam mechanism, and said chassis has an urging member attached thereto for engaging said urging cam surface to bias said action control portion into said locking portion.

5. The clamper mechanism of claim 1, wherein said means for moving said carriage is further adapted for moving said first clamper cam mechanism with respect to said carriage.

6. The clamper mechanism of claim 1, wherein said action control cam groove further comprises a recessed portion for engaging said action control member of said locking lever to cause rotation of said locking lever, and to limit motion of said locking lever in said retraction and protrusion direction, following movement of said holding means to said clamping position.

7. A clamper mechanism for a disk player having a housing comprising a chassis, a playback mechanism mounted in said housing for playing back a recording disk, said playback mechanism including a spindle motor for supporting said disk, a carriage mounted in said housing for movement relative to said chassis in a protrusion direction to a first position for receiving a recording disk and for movement relative to said chassis in a retraction direction to a second position proximate said spindle motor, and means for moving said carriage between said first and second positions, said clamper mechanism being adapted for clamping said disk to said spindle motor, and said clamper mechanism comprising:

a clamp movable between a clamping position at which said disk is clamped to said spindle motor and a non-clamping position at which said clamp is clear of said disk;

holding means for holding said clamp;

a first clamper cam mechanism being mounted for reciprocatable movement is said retraction and said protrusion directions with respect to said carriage when said carriage is in said second position; and a second clamper cam mechanism mounted in said housing for reciprocatable movement in said retraction and protrusion directions with respect to said chassis, and having a clamp holder cam portion, and a locking lever pivotably mounted thereon, said locking lever having a driving force transmission member, and action control member, and one of an urging cam surface and an urging member, wherein said chassis has an action control cam groove formed therein with a locking portion for engaging said action control member to prevent motion of said locking lever and thereby said second clamper cam mechanism relative to said chassis in said retraction and protrusion directions, and the other one of said urging cam surface and said urging member, said urging member being provided for engaging with said urging cam surface to bias said action control member into said locking portion, said first clamper cam mechanism further includes a motive power cam surface (30b) for engaging said driving force transmission member to move said lever in said protrusion direction in response to movement of said first clamper cam mechanism in said protrusion direction, and said holding means has a cam member for engaging said clamp holder cam portion of said second clamper cam mechanism for moving said holding means from said clamping position to said non-clamping position in response to said movement of said first clamper cam mechanism in said protrusion direction, said urging member being positioned and adapted for engaging said urging cam surface to bias said action control member into said locking portion by rotation said locking lever following movement of said holding means to said non-clamping position.

8. The clamper mechanism of claim 7, wherein said action control cam groove further comprises a recessed portion for engaging said action control member of said locking lever to limit motion of said locking lever in said retraction and protrusion directions when said holding means is in said clamping position, and for causing rotation of said locking lever in response to movement of said first clamper cam mechanism in said protrusion direction.

* * * * *